United States Patent
Paczkowski (10) Patent No.: US 12,477,328 B1
(45) Date of Patent: Nov. 18, 2025

(54) SYSTEMS AND METHODS FOR IMPLEMENTING A ZERO TRUST MODEL IN CONNECTION WITH 5G NETWORKS

(71) Applicant: T-Mobile Innovations LLC, Overland Park, KS (US)

(72) Inventor: Lyle Walter Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 900 days.

(21) Appl. No.: 17/360,065

(22) Filed: Jun. 28, 2021

(51) Int. Cl.
*H04W 12/06* (2021.01)
*H04L 9/40* (2022.01)

(52) U.S. Cl.
CPC .............. *H04W 12/06* (2013.01); *H04L 63/08* (2013.01)

(58) Field of Classification Search
CPC .................................................. H04L 9/0643
See application file for complete search history.

(56) References Cited

U.S. PATENT DOCUMENTS

| | | | | |
|---|---|---|---|---|
| 10,348,488 B1* | 7/2019 | Paczkowski | ............ | H04L 9/0643 |
| 10,936,422 B1* | 3/2021 | Paczkowski | ........ | G06F 11/1417 |
| 10,951,615 B1* | 3/2021 | Paczkowski | .......... | H04W 12/71 |
| 10,958,434 B1* | 3/2021 | Marquardt | .............. | H04L 43/10 |
| 10,986,500 B1* | 4/2021 | Marquardt | .............. | H04L 63/12 |
| 11,038,857 B1* | 6/2021 | Paczkowski | ............ | H04W 4/14 |
| 11,316,690 B2* | 4/2022 | Madisetti | .............. | H04L 41/044 |
| 11,695,568 B1* | 7/2023 | Kempf | ................... | H04L 9/3242 |
| | | | | 713/176 |
| 2016/0205128 A1* | 7/2016 | Holtmanns | ........... | H04W 12/37 |
| | | | | 726/1 |
| 2018/0337931 A1* | 11/2018 | Hermoni | ............. | H04L 63/0823 |
| 2019/0190697 A1* | 6/2019 | Cunico | ................. | H04L 63/123 |
| 2020/0057860 A1* | 2/2020 | Patil | ..................... | G06F 21/6209 |
| 2020/0084202 A1* | 3/2020 | Smith | ................... | H04W 12/08 |
| 2020/0099591 A1* | 3/2020 | Clarke | ............... | H04L 41/0895 |
| 2020/0195495 A1* | 6/2020 | Parker | ..................... | H04L 41/40 |
| 2020/0204444 A1* | 6/2020 | Marquardt | .......... | H04L 41/0843 |
| 2020/0220791 A1* | 7/2020 | Aiello | ..................... | H04L 41/40 |
| 2020/0302434 A1* | 9/2020 | Sethi | .................... | G06F 9/45558 |
| 2020/0351650 A1* | 11/2020 | Maria | ................. | G06F 9/45558 |
| 2021/0109746 A1* | 4/2021 | Brugman | ................ | G06F 8/656 |

(Continued)

OTHER PUBLICATIONS

H.-T. Sun and C. Peng, "Event-Triggered Adaptive Security Path Following Control for Unmanned Ground Vehicles Under Sensor Attacks," in IEEE Transactions on Vehicular Technology, vol. 72, No. 7, pp. 8500-8509, Jul. 2023. (Year: 2023).*

(Continued)

*Primary Examiner* — Kari L Schmidt
(74) *Attorney, Agent, or Firm* — Shook, Hardy & Bacon L.L.P.

(57) ABSTRACT

Methods and systems are provided for assigning one or more Virtual Network Function (VNF) instances, or slices, to devices, and for monitoring each change of state associated with the slices. Embodiments include applying an Advanced Security Control (ASC) protocol to verify devices for each request for access to a slice, to establish a zero trust measurement with respect to a network, such as a 5G network. In embodiments, a blockchain is associated with each slice and stored in a distributed ledger, for example to allow rapid access to network slice and device information if a slice will be re-instantiated.

20 Claims, 6 Drawing Sheets

(56) References Cited

U.S. PATENT DOCUMENTS

| | | | | |
|---|---|---|---|---|
| 2021/0195421 A1* | 6/2021 | Marquardt | ............ | H04L 63/062 |
| 2021/0306135 A1* | 9/2021 | Chu | ...................... | H04L 9/0643 |
| 2021/0337033 A1* | 10/2021 | Madisetti | .............. | H04L 67/104 |
| 2021/0352077 A1* | 11/2021 | Benedetti | .............. | H04L 9/3247 |
| 2022/0021538 A1* | 1/2022 | Madisetti | .............. | H04L 63/105 |
| 2023/0180009 A1* | 6/2023 | Balmakhtar | .......... | H04W 12/08 |
| | | | | 726/4 |

OTHER PUBLICATIONS

I. Adam and J. Ping. 2018. Framework for Security Event Management in 5G. In Proceedings of the 13th International Conference on Availability, Reliability and Security (ARES '18). Association for Computing Machinery, New York, NY, USA, Article 51, 1-7. (Year: 2018).*

Suomalainen, Jani, et al. "Security awareness in software-defined multi-domain 5G networks." Future Internet 10.3 (2018): 27. (Year: 2018).*

* cited by examiner

SYSTEMS AND METHODS FOR IMPLEMENTING A ZERO TRUST MODEL IN CONNECTION WITH 5G NETWORKS

SUMMARY

Network carriers face constant and growing threats of attacks networks from various sources. For example, the risk of endpoint attacks is rising, and it is challenging to carriers to track and block attacks and to keep networks secure. More recently, it has been proposed carriers could improve network security by shifting security practices away from solely securing machines against malware, and instead implemented technologies based on an assumption that any devices inside or outside of a network could be compromised. However, current technologies such as layer 7 applications may not provide sufficient protection against attacks, and deploying a layer 7 application can significantly degrade the performance of a system, because the kernel of the system may be modified.

Technologies that require modification of the kernel are not suitable for this reason, and because they can provide opening for attacks and void warranties relating to a system. Technologies also fail to capture certain attacks, such as control flow attacks and attack vectors, and fail to report or store information about attacks in a remote data store or receptacle. Additionally, technologies may fail to obfuscate data relating to monitoring, which itself could provide clues to an attacker about a system and/or its weaknesses. The monitoring tools for layer 7 applications do not allow for monitoring of shared data resources, server systems, or network access platforms in an on-going, secure manner. For example, layer 7 technologies may reach layer 7 and possibly layer 6, but these application-level solutions do not reach lower. A need exists for improved technologies for advanced monitoring and measurement with respect to network security, for example in a 5G network, where silos or slots may now be virtual, as opposed to physical as found in conventional networks.

In the context of 5G networks, a device such as a server or an appliance can request a Virtual Network Function (VNF) instance or "slice," for example a virtual connection or thread of connectivity between the device and an endpoint. In the context of virtual slices, a need exists for ensuring a virtual slice actually carries a zero trust measurement. Embodiments described herein include aspects that interact with the 5G protocol and provide improved technologies for assigning VNF instances to devices. For example, an Adaptive Security Controller (ASC) can generate specific engagement rules using smart contracts and Distributed Ledger Technology (DLT). Embodiments overcome deficiencies in prior technologies relating to relying on prior determinations of trust, and embodiments provide monitoring and measuring of VNF instances or slices.

Figure 3:
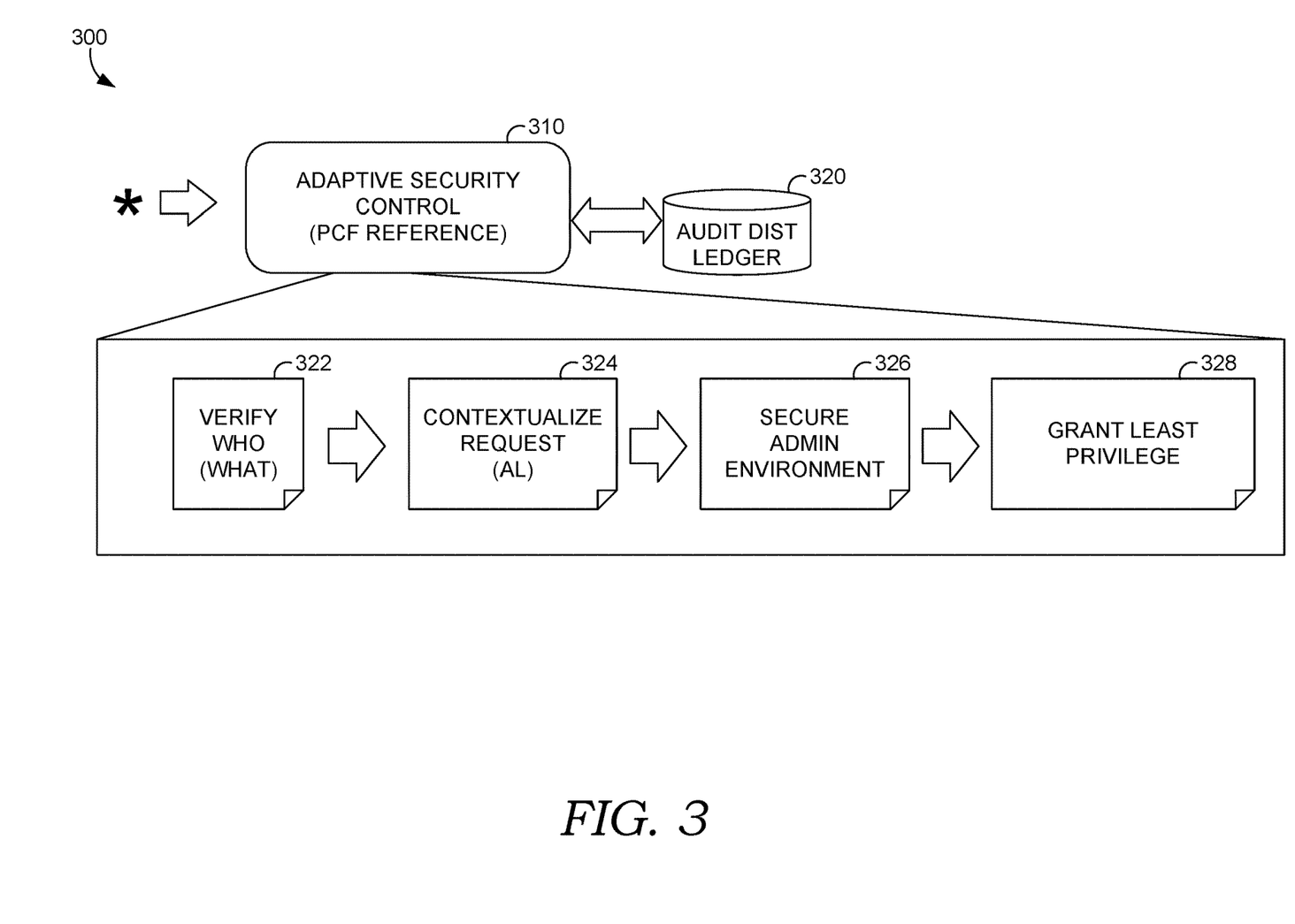
FIG. 3 depicts exemplary components including a flow diagram of aspects suitable for use in implementations of the present disclosure.

In embodiments, an improved system for provisioning of a VNF instance includes a network component, in communication with a distributed ledger database, configured to assign a first VNF instance to a first device, and a first blockchain associated with the first VNF instance, where the first blockchain is stored in the distributed ledger database including a first indication the first device was authenticated. In some cases, the network component comprises an ASC including a verification component and a least-level privilege grant component. For example, an ASC 310 discussed in more detail below can perform a verification of who or what device is seeking access to a network slice, and an ASC 310 can grant a least- or lowest-level of privilege or rights needed for a user or action. In embodiments, the blockchain includes an end-of-life block.

Figure 4:
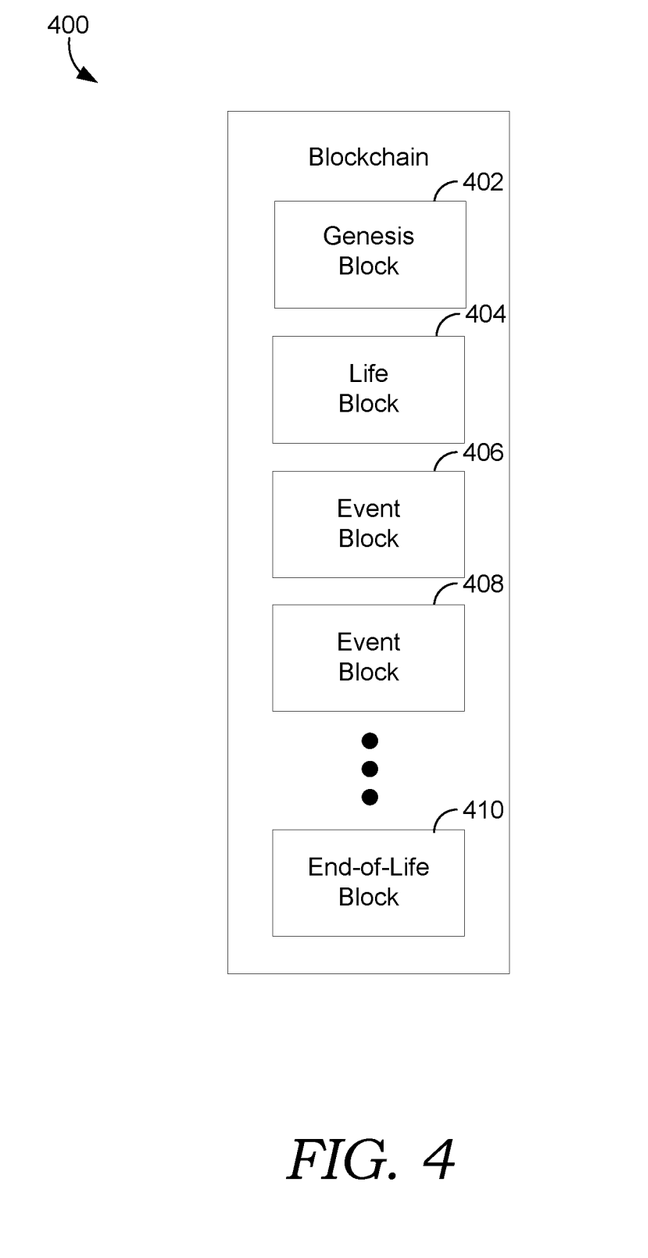
FIG. 4 depicts an exemplary diagram of aspects of a system suitable for use in implementations of the present disclosure.

The blockchain can be terminated and stored; and data from one or more blocks of the blockchain can be quickly- or readily-accessible to determine one or more aspects of a second VNF instance to be assigned to the first device. In some cases, a second blockchain is associated with a second VNF instance, and the second blockchain is stored in the distributed ledger database, including a second indication the first device was authenticated. In embodiments, the VNF instance is a dedicated instance for a customer. In some cases, the first blockchain includes one or more smart contract aspects. For example, blocks of a blockchain, such as blockchain 400 discussed below, can include program components or code, for example, that implement parameters based on terms, such as technologies that a carrier will provide to a customer and specific technical aspects of the network slices to be assigned to devices.

In some cases, a method of securing and storing network interactions includes generating a first blockchain associated with a request for access to a first slice by a first computing device, stored on a distributed ledger system, and comprising at least a first block comprising predetermined smart contract parameters and information associated with the computing device, and a second block comprising information associated with providing access to the first slice by the computing device and a first hash indicating a link to the first block. The method can include determining that the first computing device has requested access to a second slice, determining that the first computing device is trustworthy, and allowing the first computing device access to the second slice. In some cases, the first blockchain further comprises at least a zero block comprising slice information. For example a zero block can be a genesis block and can include information about the carrier and/or the VNF instance or slice to be monitored by the blockchain. Embodiments include automatically generating a second blockchain based on determining that the first computing device has requested access to the second slice.

For instance, the first blockchain can also include a third block comprising information associated with the first computing device communicating with a second computing device. The third block can include an indication that the second computing device is trustworthy. In some cases, access to the first slice by the first computing device is terminated and information about the first slice is accessible for rapid re-instantiation of the slice. For example, the improved technologies described herein include an ASC and a distributed ledger database, and the blockchains utilized to track changes of state for each slice can also allow a system to rapidly retrieve certain slice and/or device information to rapidly re-instantiate the same slice, or a new slice with sufficiently-similar parameters, for example according to smart contract information included in the blockchains. In some cases, a hardware root of trust token is provided by the system for the first computing device, which can also contribute to more rapid establishment of aspects of a network in compliance with zero trust measurements.

In embodiments, one or more non-transitory computer-readable media include computer-executable instructions embodied thereon that, when executed, perform a method for implementing zero trust measures in a network environment, the method comprising authenticating a first device for access to a first network instance, authenticating the first device for access to a second network instance, terminating the access to the first network instance by the first device, and authenticating the first device for re-access to the first network instance. Additionally, the method can include documenting the access and the re-access to the first network instance by the first device in a first blockchain, for example, and documenting the access to the second network instance by the first device in a second blockchain.

In this example, the first and second network instances can be 5G network instances. The first blockchain and the second blockchain can comprise at least a portion of a hyperledger stored in a distributed ledger database, for example the distributed ledger database 320 described below. In embodiments. Methods also include terminating the re-access to the first network instance by the first device, and, in some cases, failing to authenticate the first device for a second re-access to the first network instance. In embodiments, the failure to authenticate the first device for a second re-access to the first network instance is documented in the first blockchain, for example as part of an event block. In some cases, a root of trust token for the first device can be generated by the system.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Certain acronyms are used to describe embodiments herein or are used in the Figures. The acronyms are provided below for reference.

| | |
|---|---|
| AI | Assimilated Intelligence |
| AF | Application Function |
| AMF | Access and Mobility Management Function |
| ASC | Adaptive Security Controller |
| AUSF | Authentication Server Function |
| CHF | Charging Function |
| DLT | Distributed Ledger Technology |
| DN | Data Network |
| gNB | 5G Radio Node |
| GPRS | General Packet Radio Service |
| GTP-U | GPRS Tunneling Protocol User Plane |
| HRoT | Hardware Root of Trust |
| MVC | Minimum Viable Consensus |
| NAS | Non-access Stratum |
| NEF | Network Exposure Function |
| NG-AP | Next Generation Application Protocol |
| NG-RAN | Next Generation-Radio Access Network |
| NSSF | Network Slice Selection Function |
| NFV | Network Function Virtualization |
| PCF | Policy Control Function |
| PFCP | Packet Forwarding Control Protocol |
| SMF | Session Management Function |
| UE | User Equipment |
| UDM | Unified Data Management |
| UDR | Unified Data Repository |
| UPF | User Plane Function |
| VNF | Virtual Network Function |
| Xn | Network Interface |
| XnAP | Xn Application Protocol |

In embodiments, aspects of the present disclosure relate to a zero trust security framework, which can secure against malware, as well as going further and requiring verification of devices anytime the devices attempt to access a system, for example a system in a 5G network ecosystem. Systems can benefit from protections against vulnerabilities at the device level and at the end-user (human) level, because many attacks occur through phishing links or other attempts to obtain passwords. Thus system security can be improved by implementing a zero trust framework, which can treat any device as if it is already compromised. Systems using 5G network technology can benefit from these improvements, for example because such systems may be accessed utilizing user credentials (e.g., login and password information). As stated above, layer 7 applications can be insufficient or not robust enough to provide a reliable defense against attacks. For example, layer 7 monitoring tools may be purchased or programmed to oversee processing platforms, but these tools generally only utilize product logs and do not provide a systematic process with a many-to-one data correspondence or information process. The improved systems described herein provide a reliable defense against attacks.

In the context of 5G, the improved network security technologies described herein can be even more critical, because 5G network technologies can use Network Function Virtualization (NFV) to provide virtual slices or connectivity threads to devices, which can be reutilized in some cases. Additionally, aspects of 5G code can be located within a third-party (customer) system, for example, behind a firewall. The virtual aspect of network instances in 5G, and the ability for some aspects to run at a customer site, in some cases, increases the need for systems, described herein, for an improved distributed ledger technology to ensure the virtual instances are both secure (e.g., free from attack or other dangers) and trustworthy (e.g., reliable). For example, a device can be established as trustworthy, for example using a two-factor authentication or another approach, each time the device seeks to be assigned a slice and/or seeks to perform certain actions. In some cases, a secondary device that will be communicated with can also be established as trustworthy, for example using two-factor authentication or another method.

For example, a VNF slice can allow virtualized and independent logical networks using the architecture of a main network, such as a 5G network. Each slice can operate as a private 5G network, and each slice can be automatically generated, assigned, and/or configured according to use cases and preferences of a customer, which can be reflected in smart contract code in each blockchain that corresponds to a slice. Devices such as appliances or customer servers, for example, can benefit from the option to scale the deployment of slices and to decoupling network instances from network hardware. Although the slices can be considered bundled with respect to one or more devices using the slices, slices remain independent or isolated and do not impact the performance of other slices, for example for security and privacy reasons. In some embodiments, a slice can include one or more of a slice controller component and layers, such as a service layer, a network function layer, and/or an infrastructure layer.

As described in more detail below, embodiments provide new and improved protocol technologies that interact with 5G network protocols. In an example, a smart contract is utilized to govern the terms of one or more VNF instances or slices. A smart contract can comprise programmable and executable code that is included in a blockchain, which can reflect terms of use of VNF slices by customers of a network carrier, for example. In embodiments, blockchains are utilized in a ledger system, for example a distributed ledger and/or a hyperledger system, to assign and implement VNF slices to devices securely and reliably, and to monitor and analyze on-going use of VNF slices by devices using a network, to improve the security of the network.

Figure 1:
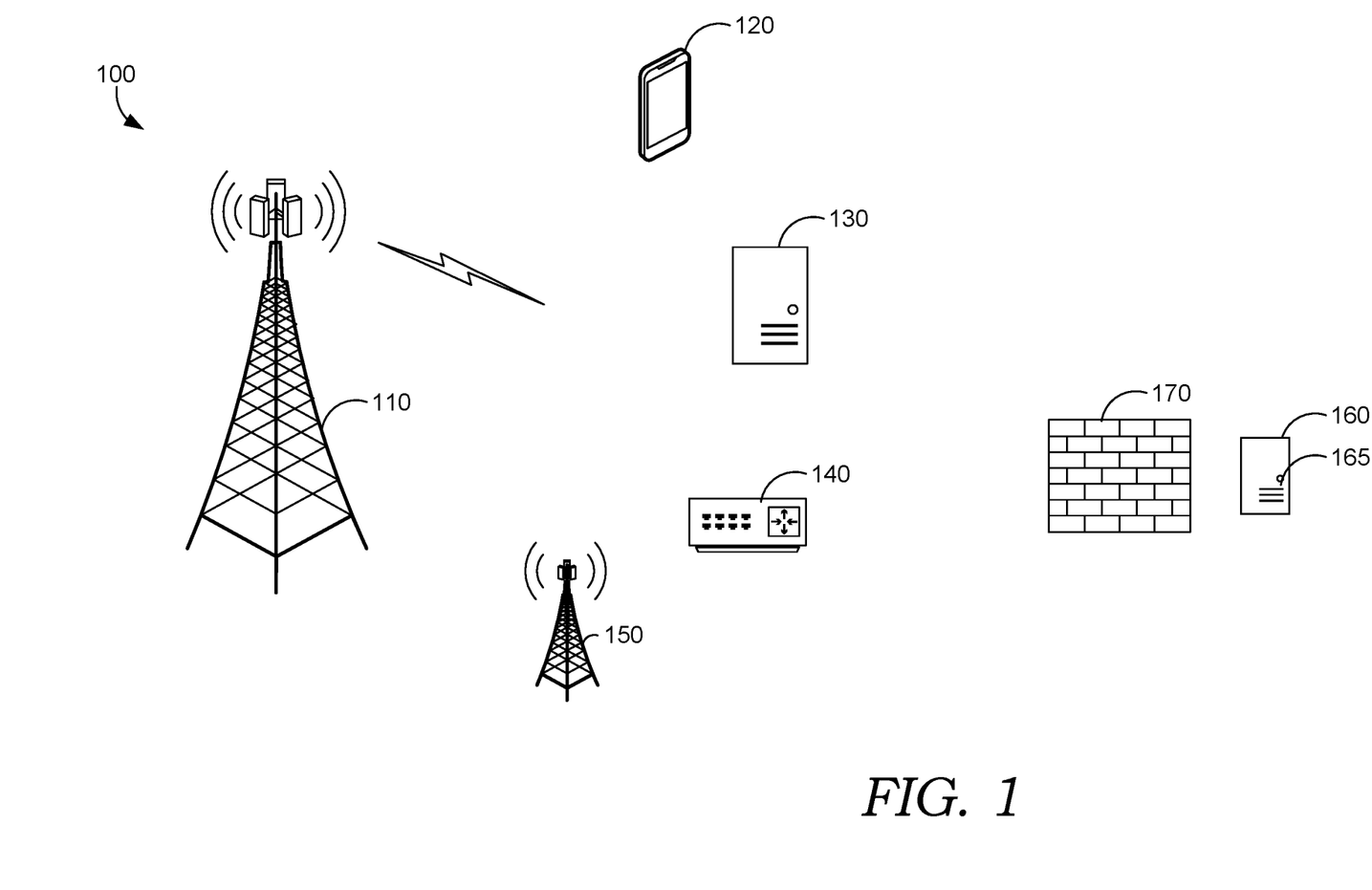
FIG. 1 depicts an exemplary network environment suitable for use in implementations of the present disclosure.

Turning to FIG. 1, an exemplary network environment 100 is shown. The aspects of this exemplary network are merely illustrations to aid in understanding the implementations of embodiments of the present invention. For example, an exemplary network environment 100 can include a tower 110, which can be a base station or 5G tower. The network environment 100 can include one or more towers, such as tower 110, and one or more user devices such as user device 120, for example user handsets or other end-user devices, such as hard drives or servers. In embodiments, server 130 is part of network environment 100 and in communication with tower 110, directly or through one or more intermediary devices. In some cases, both user device 120 and server 130 can request a VNF instance or slice, or a virtual connectivity thread using the 5G network.

Network environment 100 in FIG. 1 includes an exemplary router 140, which can also be a device or appliance that requests a VNF instance or slice using the 5G network, in embodiments. In some cases, one or more other towers 150 can be present as part of providing a 5G network and/or as part of connecting aspects of a 5G network with one or more legacy networks. In the illustration in FIG. 1, a customer server 160 is shown, for example, operating behind an indication of a firewall 170. A customer server 160 can include aspects of 5G code 165, such as protocols or proprietary code. As described, even if a user device 120 or server 130, or a customer server 160, have accessed a VNF instance or slice previously, the improved technologies disclosed herein treat all such devices as potentially compromised and does not trust the devices, while generating and maintaining a distributed ledger system to securely assign VNF instances to the devices.

Figure 2:
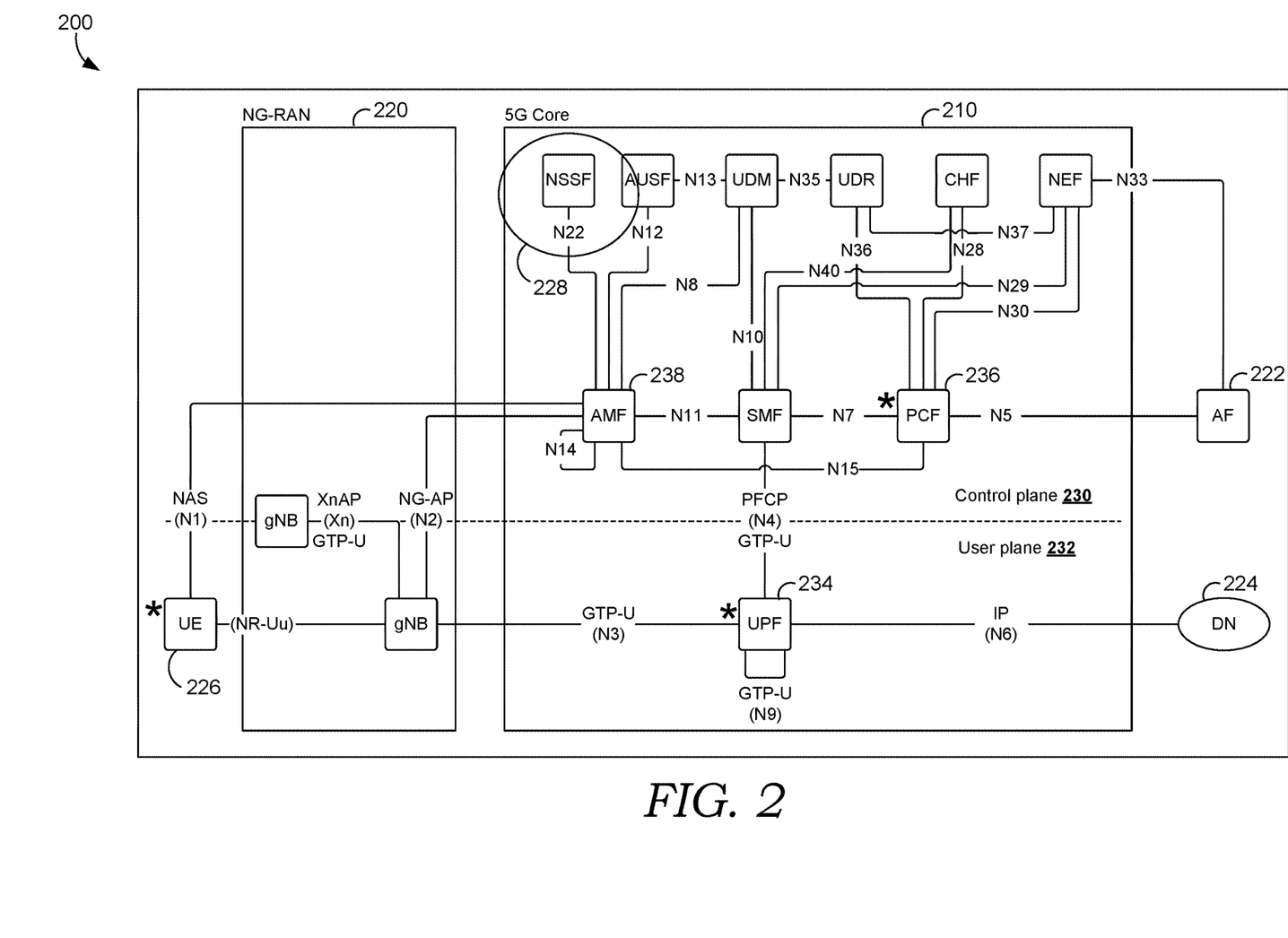
FIG. 2 depicts an exemplary diagram of aspects of a system suitable for use in implementations of the present disclosure.

Turning to FIG. 2, an exemplary reference diagram 200 of aspects of a system is shown, such as a wireless network system. The reference diagram 200 includes a 5G core 210 on the right side and a Next Generation-Radio Access Network (NG-RAN) 220 on the left side. The aspects shown in FIG. 2 are merely examples of aspects that can be included and/or used in conjunction with embodiments of the present invention. For example, an Application Function (AF) 222 and a Data Network (DN) 224 are shown in communication with the 5G Core 210. In this example, user device (or user equipment, UE) 226 is shown on the bottom left of FIG. 2.

The UE 226 is denoted in FIG. 2 with a "*," which will be referred to with respect to FIG. 3. In embodiments, the "*" indicates a security boundary, for example, meaning the UE 226 will be subject to an Adaptive Security Control (ASC) 310). In embodiments, the UE 226 may request a VNF instance or slice that uses one or more 5G network components. The request can be received by a system, for example at components such as a Network Slice Selection Function (NSSF) 228. As discussed in more detail below, systems in accordance with embodiments herein can implement an ASC for UE 226 and/or other devices prior to, or as part of, assigning and monitoring use of one or more slices. A UE 226 can represent a wireless device, for example, while a DN 224 can represent a security boundary with respect to a non-wireless device, for example, which can be subject to an ASC 310. As discussed herein, when a wireless or non-wireless device seeks access to a slice with respect to a network, a security boundary can trigger the ASC 310 so that a system can automatically establish trust sufficient to assign a slice.

Continuing with the exemplary aspects of reference diagram 200 in FIG. 2, a control plane 230 is shown above the dashed line, with a user plane 232 below the dashed line. A User Plane Function (UPF) 234 is shown, also denoted with a "*," which will be discussed with respect to FIG. 3. Similar to UE 226 (which can correspond to a user device 120 or a server 130 in FIG. 1), a UPF 234 can represent a security boundary, indicating where a wireline device can be connected, which can be subject to an ASC in order to improve security technologies that can implement zero trust principles in the context of 5G network activities. In embodiments, a request for a VNF instance (whether new or re-utilized) can be received directly or indirectly be an Access and Mobility Management Function (AMF) 238, which can communicate information about one or more devices, such as UE 226 or UPF 234, to an NSSF 228 or to one or more other components, in order to implement access to one or more VNF instances, as determined to be secure and trustworthy by the system. For example, an AMF 238, or another aspect of the system, can detect a request from a UE or UPF 234, for example, and subject the devices to an ASC 310 protocol, as described with respect to FIG. 3. An NSSF 228 can request that devices, such as UE 226 or another appliance, substantiate various use cases. In reference diagram 200, the use of "N" indicates exemplary interfaces or reference points showing connections or data paths in reference diagram 200.

In another example, an AF 222 communicates directly with a Policy Control Function (PCF) component 236. This PCF component 236 is also denoted by a "*," and in embodiments this component, or requests handled by this component, are subject to an ASC 310 protocol. In some cases, only a UE 226 is subject to an ASC protocol, but in some cases multiple components or aspects are subject to the ASC 310, for example a plurality of devices requesting VNF instances or slices.

In networks, such as a 5G network, for example, UE 226 could include a cellular phone, for example, or a server, or in some cases UE 226 could be a device such as an appliance, for example a dishwasher, refrigerator, home security system, or other equipment with a computerized aspect capable of communicating with one or more other devices or aspects of a network. For instance, an appliance such as a smart washing machine may make requests for network access in order to determine preferred settings relating to heat and water use for a given location, and/or to communicate with one or more other devices in a home, for example regarding a schedule in order to maintain the overall noise level in the home below a threshold. Many other circumstances exist when one or more devices would request access to a VNF instance or slice. As one example, a company may need to make secure transmissions from one location to another and one or more servers may request VNF slice access, for instance to send data from one laboratory or data center to another. In another example, a hacker may improperly request a VNF slice using a compromised device, such as a compromised UE 226.

In one embodiment, a device may be associated with three different types of VNF instances or slices over time, which can be tracked by a ledger system as described herein. For example, a device may be a server or handset or other computing device seeking to use aspects of a network, such as a 5G network, for example a smart appliance, such as the devices shown in FIG. 1. The device could request and use up to three types of slices, in this example, at various time. First, the device could use an ultra-reliable, low-latency 50 millisecond type of slice for precise functions, for example at particular times. In some cases, this slice can have various parameters and/or be a dedicated or designated slice for a particular customer. The second type of VNF instance or slice utilized by the device could be a machine-tag type of slice, for example for an appliance to communicate with another appliance. The third type of slice could be a mobile broadband type of slice, for example for a voice application, and this slice could be utilized briefly, for example, and then requested again soon, such as within an hour or day, and/or it may be requested over a longer period, such as months, for example if a slice is permanently assigned to a certain use or entity. Each of these slices, along with their uses and associated devices, and certificates indicating trustworthiness, can be generated and monitored by improved systems implementing embodiments of the present invention. In embodiments, a distributed ledger system is implemented comprising precise documentation for all slices including all endpoints associated with, or run through by, the slices.

In networks, various slices can be turned on or off during a session by the system, and/or re-activated. A device such as an appliance (e.g., UE 226) may use a bundle or subset of slices, and a system may preserve information regarding one or more slices utilized by each of a plurality of devices for future use. An entire bundle of slices associated with a device can terminate at a point, but embodiments herein preserve information regarding start and stop points, and other use data, for individual slices in the bundle of slices. For example, a high-capacity log such as a ledger using DLT can be stored in a database and can keep track of itself, including for example how many slices exist, which types, and when each was turned on or off, to service which devices. Embodiments enable VNF instances or slices to be labeled and tracked and/or handled together, as associated slices, even though each may have its own purpose and times of use, for example.

For example, in 5G networks, release 15 can allow up to eight slices for a device. These slices are virtual and require security, and they require being implemented and to be monitored in association with each other. A device may begin by requesting or using one slice for an initial purpose, but then may seek to use to one or more additional slices, but the network cannot assume the device is secure and trustworthy at the point of the second request. Thus an ASC 310 protocol, discussed with respect to FIG. 3, can be implemented or required for each request for a slice or VNF instance by each device, such as a smart appliance, server, or handset. In release 16 of 5G, and in future releases, unlimited slices may be allowed, making the need for implementing and monitoring use of the slices even more critical to the performance of the network and its continued security. In some cases a device such as UE 226 can comprise a high-science device such as a server (e.g., server 130) or a router (e.g., router 140) that do not use proprietary operating systems and that will be required to be checked and re-checked as VNF instances or slices (or additional "lanes" of use) are requested by or assigned to the devices. The various types of slices, such as the three major slices discussed above, can be defied by 3GPP. Within these three major types of slices, a network provider or carrier can carve out specific Quality of Service parameters and offer such parameters as a service. These services can comprise special tunnels that may run concurrently from a network to a UE, such as UE 226. These tunnels, in some cases, can correspond to a VNF instance or slice, as described herein.

Turning to FIG. 3, a flow diagram 300 showing aspects of an ASC 310 is shown, illustrating one or more steps implemented by embodiments of the exemplary ASC 310 described herein. In embodiments described herein, a new distributed ledger service is provided that improves network security technologies, for example using blockchain to track the active checking, and regular re-checking (and re-issuing of certificates) by devices using VNF slices. The Adaptive Security Control (ASC) 310 discussed with respect to FIG. 3 can be applied to various components or requests from components, such as the UE 226 device, each time that an individual slice is initiated, to create a complete distributed ledger database 320. Although an exemplary distributed ledger database 320 is shown in FIG. 3, it should be understood that a distributed ledger database 320 can be stored across one or more data storage components, and certificates that are stored, for example by an ASC 310 to verify or authenticate devices, can also be stored in across one or more data storage components but accessible for an audit, for example. An exemplary representation of a blockchain for an illustrative slice is shown in FIG. 4, discussed below.

An ASC 310 in embodiments comprises a new data creation and network transfer mechanism based on a system measurement and/or monitoring tool. For example, a system including an ASC 310, for example, can generate specific operational blockchains, such as blockchain 400 in FIG. 4, that can check each device seeking to access or use a VNF slice for trust certificates, or it can reissue expired certificates, or issue new certificates, which can be stored in a distributed ledger database 320 and can be audited if needed.

One or more points in a 5G network ecosystem, indicated by a "*" in FIG. 2, can trigger automatic application of ASC 310 as part of generating or assigning a slice to a device. For example, a UE 226 in FIG. 2 requests a slice of any type, such as a dedicated slice assigned to a customer or a new or re-utilized slice. Any device seeking to use a VNF instance or slice can trigger, in the system, the improved ASC 310 protocols in embodiments. For example, the UE 226 may be a server device. The ASC 310 protocol can require the UE 226 to verify at 322, for example by providing verification of the device's identity and/or user.

In some cases, a known credential can be used to verify a device, such as UE 226. Verification can include analyzing or determining aspects of a hardware root of trust. In some cases, devices such as mobile devices may include certain credentials relating to silicon space to establish a true ID and/or a true user. A mobile device has a secure zone provided by Arm called Trusted Execution Environment (TEE).

ASC 310 can also contextualize a request at 324, for example using Assimilated Intelligence. At 326, the administrative environment is secured, for example by checking or confirming the integrity of the administrative environment utilized to assign slices and/or to monitor the use of slices, for example. This can be done in various ways, in embodiments, to accomplish a higher or improved level of certainty prior to granting rights to use a slice. In one example, an ASC 310 can check for a hardware root of trust certificate at a network element or a UE, such as UE 226. As shown at 328, ASC 310 protocols can grant the least privileges needed for the task or request to the device. The least privileges can be the minimum level of access or permissions that a user or device needs to perform a function.

As shown in FIG. 3, an ASC 310 can include a PCF reference. In other words, ASC 310 can check a PCF (such as PCF 236 as illustrated in FIG. 2). A PCF can be a core element that is used by ASC 310 as an authority. For example, ASC 310 can check a PCF to validate authority and authorization. A PCF, such as PCF 236, can be signaled to a request anew Service Data Flow (SDF), in some cases with a specific Quality of Service. In embodiments, a PCF 236 can send rules relating to the Quality of Service for a new SDF to the Session Management Function (SMF), and then to a local User Plane Function (UPF). Systems can implement the defined charging, Quality of Service rules, and packet filters relating to the request. In embodiments, one or more aspects of this implementation can comprise or correspond to providing a requested slice.

All of the information relating to interactions by an ASC 310 with respect to one or more VNF instances or slices can be documented in the distributed ledger database 320, which is capable of being audited. ASC 310 is in communication with the exemplary distributed ledger database 320 in FIG. 3. For each interaction of ASC 310 with a device regarding a slice, or for each application of ASC 310 protocols to a request for access to a slice, a block can be added to a blockchain representing the slice, as discussed below. Thus a blockchain can contain complete information relating to the generation and/or assignment of a slice over time.

In embodiments, an ASC 310 is integrated with a distributed ledger database 320, which can aggregate data using tool(s) to provide snapshots of an array of multiple monitored systems. A distributed ledger database 320 can be utilized to accumulate the information relating to an ASC 310 over time. In embodiments, a distributed ledger database 320 uses a Minimum Viable Consensus (MVC) or a "rumor" data integrity method. An ASC 310, in embodiments, can include one or more Assimilated Intelligence (AI) components or algorithms. For example, an AI component as part of an ASC 310 can automatically and proactively preserve a chain of prior states if certain elements have been altered either by a machine and/or a hacker in a DLT database, such as distributed ledger database 320. In some embodiments, measurement and monitoring tools are utilized to analyze target kernel memory and telegraph the results, such as measurements, to a 5G container. A kernel can comprise aspects of a computer program at the core of an operating system with control over the system.

In embodiments, a distributed ledger database 320 utilizes a unique form of hyperledger data collection, transport, and archiving capabilities to create a datastore that is distributed and private, using a minimum viable consensus process. In some cases, an abridged form of consensus can be used, for example to improve the speed and reduce the resources needed to determine a device such as UE 226 is accepted or approved. For example, a consensus can be based on a small pool of trusted appliances, which can vouch for each other. In embodiments, a small set or group of trusted appliances (such as machines or devices) can vouch for new entrances, such as a new appliance requesting to use a slice. This method of determining a consensus is more rapid and efficient.

In some cases, accumulated data in a specialized DLT as described herein, for example distributed ledger database 320 that uses MVC or an equivalent, can be formalized and utilized to advance from a "zero trust" process to using "alpha trust" measures. For example, alpha trust may be the first instance of knowledge of an appliance and kernel, which can require certification of an operating system as true and unaltered, and that hardware is friendly, in some cases. When an operating system or related applications are modified, a hardware root of trust can be used to provide and/or protect this information, for establishing beta trust.

In embodiments, the distributed ledger database 320 comprises an immutable datashare, which can contain elements of information in a permanent, not editable, form. At the same time, the information can be sharable and accessible by other entities (with permission), for example. According to aspects of using a Minimum Viable Consensus, the trustworthiness of all elements will be verified, for example because they are known. Systems described herein can use certificates of authority, deposited prior, that are analyzed or read in order to validate. In some cases, if systems do not already know a device such as an appliance, an ASC 310 can initiate a process to instill trust in the device element, and adopt it to the network.

In one example, UE 226 can be a handset connected to a 5G network, which can have multiple slices associated with it. The adaptive aspect of the ASC 310 can track the slices, including the bundles of one or more slices associated with a device. In some cases, one or more trust certificates keep track of each of the slices and which endpoints each slice uses or runs through. The distributed ledger, for example in a distributed ledger database 320, can track all of certificates, in addition to other information, and this prior information including certificates can be accessed when the handset, for example, requests a new slice to be re substantiated, or when the handset seeks to re-access a previously utilized slice.

FIG. 4 depicts an exemplary blockchain 400, for example representing use of one VNF instance or slice. A distributed ledger database 320 can store one or more blockchains, such as blockchain 400, comprising one or more blocks. In some cases, blockchains can become hundreds or thousands of blocks long as events occur with respect to a VNF slice. For example, in the illustrative diagram in FIG. 4, blockchain 400 can represent a single slice. At genesis block 402, the system can generate a first block of a blockchain 400, including information to link a VNF slice to a particular device. For example, genesis block 402 can be referred to as block zero, and it can identify a network carrier, smart contract terms, and an identification of the slice at issue. In some cases, an NSSF 228 can generate a carrier slice, or a future-state automobile, for example, could request a slice, and in either case the hardware associated with the respective slices is included in block zero. At life block 404, which can be referred to as block one, the name of the user of the slice can be provided, such as a company or individual name. A DLT such as a hyperledger stored in a distributed ledger database 320 can use micro contract rules, for example, to create specific engagement specifications for the slice within a blockchain 400. The blocks of blockchain 400 establish trustworthiness and maintaining trustworthiness, in embodiments.

At event block 406, the blockchain can store information regarding use of a slice beginning or ending, by a device, for example. For instance, event block 406 can represent the use of the VNF slice by an appliance beginning, while a second event block 408 can represent the termination of use of the VNF slice by the appliance. At a later event block (not shown), the appliance could re-start use of the same VNF slice, with the distributed ledger database 320 tracking and maintaining, via blockchain, the information about the VNF slice and its uses by the device over time, including certificate information to establish trust of the device in relation to each event captured by an event block 406, 408. In some cases, an event block 406 can represent the transfer of files, implicating another slice. Each block, such as event block 406, can contain or indicate all prior information in the blockchain 400, for example with pointers to all prior blocks to preserve all data. As one example, a third block (such as event block 406) would contain pointers to blocks zero, one, and two. An end-of-life block 410 can be generated and stored by the system, for example in a distributed ledger database 320, when use of the VNF slice by a device has ended. As with other blocks, an end-of-life block 410 contains indications of all prior blocks in a blockchain 400, and blockchain 400 comprises all interactions with a VNF slice over time, from its creation or assignment until the end of its use. A termination block such as end-of-life block 410 can be a capping stone and may include a "T" or other end-of-file marker and the blockchain 400 can be stored in its entirety in a distributed ledger database 320.

In one example, a first appliance has been assigned a first slice for one or more uses, and the first appliance now wants to communicate with another appliance. In that case, trust must be established with the second appliance before it will be allowed to communicate with the first appliance. In this case, a database entry for a distributed ledger can be established, for example a DLT stored in one or more distributed ledger databases 320, with a zero block of a blockchain, such as genesis block 402 of blockchain 400. Block one, such as life block 404, can be added to blockchain 400 and can indicate the first appliance is trusted and secure, for example by identifying associated trust certificates and/or by issuing or re-issuing certificates (for example by an ASC 310). At block one in this exemplary blockchain, the first appliance can begin use of an assigned slice corresponding to the blockchain 400. When the first appliance seeks to communicate with the second appliance, it is not assumed that the second appliance is trustworthy or secure, and an event in the blockchain 400 must indicate that the second appliance has been deemed trustworthy (for example by an ASC 310 as shown in FIG. 3).

For example, block two can indicate the first appliance has been allowed to communicate with a verified second appliance. In one example, block two can indicate the interaction between the two appliances and a recording of trust for this event. These blocks are stored for each change of state, and the blockchain as a whole can be stored when the blockchain, such as blockchain 400, has ended, for example an end-of-life block 410 in FIG. 4. In some cases, the first appliance may request the same slice again in the future, in which case information from block zero and/or from block one, regarding the parameters of a smart contract and/or other information utilized to establish the slice, can be readily accessed or referenced, for purposes of re-using that information (so it does not need to be re-determined) or for continuing adding blocks to a prior blockchain. Embodiments described herein disclose ASC 310 technologies that improves trust and the use of resources in a network utilized to assign and manage virtual slices of a 5G network, for example. Embodiments provide systems that can monitor and consider a bundle of slices relating to one device such as a handset or appliance. For example, systems are able to determine that a device may be using one or more slices already, but to still require trust to be established for each additional slice to be utilized by a device.

In embodiments, information in the first one or more blocks of a blockchain 400 can be accessed and re-utilized, requiring less resources and less delay to bring a slice to market for use. In another example, a handset device is using two VNF slices but desires to use a third slice. Even though zero trust was established with respect to the first two slices, it cannot be assumed that the request for the third slice is coming from the same device. In other words, a prior authorization such as a two-factor authorization of a device cannot carry through or be sufficient with respect to the later request for a third slice, due to the virtual nature of VNF slices. Instead, in embodiments, zero trust must be established again, and all aspects validated, for each individual slice. Each slice and all of its related actions, such as access and/or attempts to access, can be fully captured and recorded in the distributed ledger 320. Events included as blockchain events can be instances of failed authentication or other rejections of access or slice assignments, for example due to lack of rights or payment by a user. In embodiments, an ASC 310 can store and/or access metadata and can determine if a certain appliance has requested a slice before, for example in order to provide the appliance with the same or similar Quality of Service. In this case, the prior quality, conditions, and other information about the prior access to a slice is stored and accessible. For example, the ASC 310 can identify a prior slice associated with the appliance and access the characteristics of the prior slice.

Some embodiments include the use of codes to establish a quality index for determining how risky and/or critical a use by an appliance may be. For example, ninety-nine levels exist in 5G that can be utilized to code riskiness. In embodiments, the system can determine a lower level of risk based on the relative value of the code(s). In some cases, systems will recognize obligations to customers to provide certain bandwidth and will accommodate these requirements using codes.

For example, as shown in FIG. 2 where one or more security boundaries are denoted with a "*," these can each be examples of a component or piece of equipment, such as UE 226, trying to do something in the system that triggers an ASC 310 to be implemented in order to maintain zero trust in the system. As one example, UE 226 could be a device such as a refrigerator, for instance a non-3GPP device that can be assigned to a network in some cases. An appliance such as a refrigerator could request another slice in order to communicate with another appliance, such as a washing machine, for example to schedule use of water or to manage noise levels, or to maintain overall heat or energy uses during peak times. In some cases, this request for a machine-to-machine slice is unauthorized and due to defective or malicious code. Therefore each request for a slice from a device, even if the device is currently using one or more slices, must be treated as if the device is potentially compromised and the ASC 310 must ensure zero trust measures are utilized again. Although one or more appliances may not be true 5G devices, such devices can still connect to a 5G network and be monitored or assigned slices in accordance with embodiments herein.

A smart contract can govern one or more blocks; for example the system can be viewed as having a separate smart contract for each block or one smart contract over several blocks. The distributed ledger database 320 herein can store a hyperledger of blockchains that represent changes in state. A block can be deposited onto a blockchain, such as blockchain 400, for every change in state or every event that changes. Many VNF instance or slices, and their corresponding blockchains, can be stored and monitored in association with a single device over time, for example as various slices are added or removed to a bundle of slices being utilized by a device.

Whenever a device such as an appliance reaches out, for example when a request for access to a slice is received by a system, an original certificate can be utilized and then referred to in the future, any time the device interacts with the system and seeks access to a slice. In some cases, a new or most-recent request can be deemed untrustworthy, causing the request to be denied and a new slice is not implemented. In such cases, it is possible to refuse to open a new requested slice until all trust is re-established, but it is not necessary to terminate earlier slices associated with serves that were and are still deemed trustworthy. An exemplary blockchain 400 can include an event block, such as event block 406, for each authentication of a single device over time, as well as other event blocks, such as second event block 408, for events such as file transfers or authentication of secondary devices (which the first device may communicate with, for example).

In some cases, embodiments allow devices to rapidly re-instantiate a slice, for example a last-utilized slice, using less resources than generating or accessing an entire slice again. For example, a smart contract reflected in a block or blockchain, such as blockchain 400, can include an index or control reference relating to another, complete or prior, chain, for access to a slice to be re-integrated using less resources. For example, a customer may be likely to re-use a slice in a month, and embodiments herein allow aspects or parameters of the slice to be stored for re-use or turning back on, as the same slice, without the need to re-integrate or re-do other aspects of the slice. For example, a tiered approach to slices can be utilized, which can allow a manufacturing entity performing supply chain operations to use the same slice again in the future, with less resources or delay required to turn a slice back on. One smart contract aspect or another aspect of a chain can be an index reference or a control that corresponds to a prior, complete chain, in some cases. For example, a block in a blockchain 400 can include a reference to a prior, terminated blockchain, for purposes of reinstating the same slice or the same or similar conditions in a new slice.

In embodiments, the last block of the last blockchain that ran a specific operation, such as a slice, can be used. The last block can be a prefect representation of all prior blocks. In an embodiment, end-of-life block 410 is a last block. In some cases, the system accesses or dips into the last block, to retrieve one or more parameters that are needed to re create the operation. It is important to provide security in this context, because a bad actor could potentially attempt to interrogate 5G elements to determine a profile to run a service on a network, such a slice, undetected. In embodiments, the blockchain will not allow for release of the information in a block unless access has been granted from a known actor or network element. The use of a distributed ledger database 320 to improve security and control relating to network capabilities provides benefits over conventional technologies, which require many indexed data formats, for example. The distributed ledger database 320 can be rigid and controlled by smart contract(s), with data readily obscured.

A DLT such as distributed ledger database 320 based on smart contract(s) can provide a constant audit trail process, including aspects such as kernel measurement, time stamps, and/or heap stack forms (for example, indications of data structures as linear or hierarchical). A distributed ledger database 320 can be immutable and used for audit or archiving purposes, in embodiments. In embodiments, a "zero trust" token is established by a system and deposited within a Hardware Root of Trust (HRoT) of a device such as an appliance. Such a token, or marker, can be utilized in future instances to accelerate authentication procedures. For example, a server 130 in FIG. 1 could be assigned and provided with a token or marker that is deposited or saved within an HRoT of the device for future reference by the system when evaluating a request to use or re-use a VNF slice, for example. A HRoT can contain keys and be utilized to enable secure boot processes, thus the HRoT must be inherently trustworthy.

For example, embodiments can instantiate a new block in a blockchain, such as blockchain 400, when an authentication is mandated. A smart contract can deal with multiple devices and be utilized to set or configure each slice associated with each device, with each slice reflected in a blockchain. In embodiments, a block is added or placed on a blockchain whenever there is a change in state to be recorded with respect to the slice represented by the blockchain. In some cases, a system may refuse to initiate a slice and/or may store an indication of a failed trust determination with respect to a particular device and slice (for example, a block in the blockchain 400 associated with the slice can record that a device unsuccessfully attempted to use or participate in). Each negative or positive action or state change is recorded in the blockchain after a generation or genesis block, such as the zero block or genesis block 402 in FIG. 4.

The following is one example of a failed request for a slice to be added for a device. For example, a router or other device such as a user computer could use two or slices, with both instances based on established trust with the device and both having maintained security. At a point in time, a third slice can be requested to be substantiated, but now the device associated with this request for a third slice cannot be determined to be trusted. In response, the third slice can be halted or refused, and/or the first two slices can be maintained or removed. Additionally, in some cases, a freeze can be imposed on any new slices associated with the device until the trustworthiness is resolved or re-established by the system. If the first two slices are terminated, they may each be associated with a blockchain, such as blockchain 400, that are ended and stored. In the future, the certifications and/or other aspects of the stored information regarding the slices can be accessed to provide a rapid reinstantiation of one or more slices or slice parameters using less system resources. In some cases, the blockchain(s) are stored in association with the device(s) that accessed slice(s) as recorded in the blockchain(s). This can allow many slices to be monitored or recorded per device, in embodiments, in a many-to-one data structure.

In an embodiment, a customer of a network carrier or another end user is associated with a customer server, such as customer server 160. In some cases a customer server 160 or another type of device can be behind a firewall 170, and can include aspects of 5G code 165, which can be utilized by customer server 160 in the context of a slice. For example, a customer server 160 can be a type of UE 226, and a system can apply an ASC 310 protocol as shown in FIG. 3 to a request for a slice to be utilized by the customer server 160. An ASC 310 protocol can cause the origination of instantiation of a blockchain, for example a genesis block 402 of blockchain 400, where the genesis block (or zero block) contains indications of the network slice itself and a provider, along with other information in some cases. A first block or life block 404 can be utilized to store or record information regarding the customer server 160 and aspects of a smart contract, which can be represented in the blockchain 400 and can govern aspects of the slice to be utilized by the customer server 160. In some cases, the slice may be a dedicated, private VNF instance or slice using aspects of a 5G network, which can be indicated by the smart contract parameters programmed into the blockchain 400.

A customer server 160 can be deemed trustworthy, for example by being authenticated, which can be recorded as an event in the blockchain 400 for the slice. Other changes of state can be recorded as event blocks in the blockchain 400, up to any amount of blocks, for example thousands of blocks. At some point, an event block, such as event block 408, can correspond to an end of use of a slice by the customer server 160, with the blockchain being stored (for example in a distributed ledger database 320). At a later point in time, such as later the same day or months in the future, as examples, the customer server 160 can request to access the same slice again, or can request a new slice with the same parameters as the prior slice. In such cases, a distributed hyperledger comprising blockchains can include a blockchain 400 indicating all events since origination of the slice. Resources can be conserved and less time and work can be required by accessing one or more parameters of the slice and/or the customer server 160 from a blockchain 400, which can cause a network to operate more effectively and efficiently, with increased security and trustworthiness.

Figure 5:
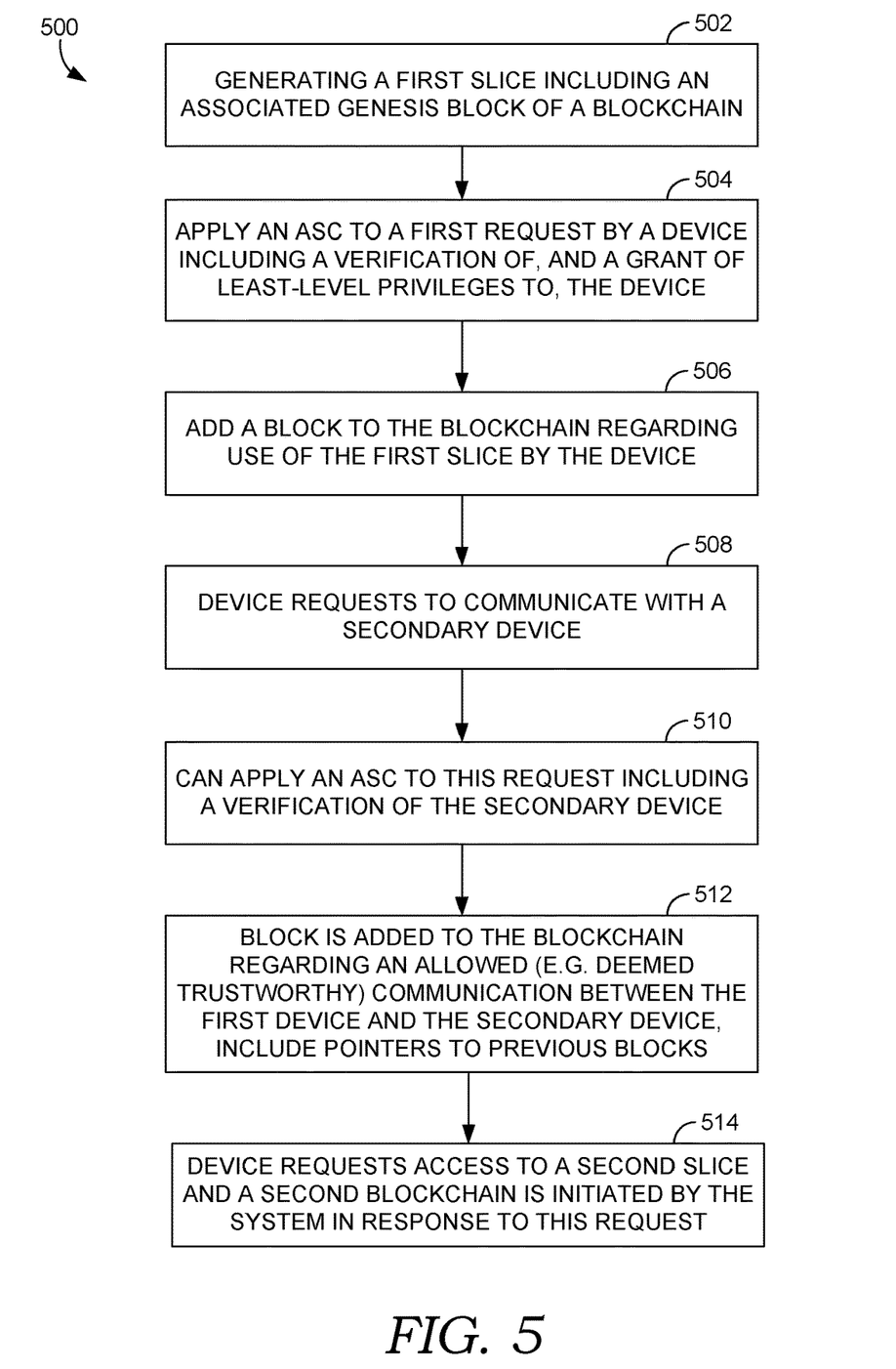
FIG. 5 depicts an exemplary flow diagram illustrating aspects of a system suitable for use in implementations of the present disclosure.

Turning to FIG. 5, an exemplary flow diagram 500 is shown including aspects in accordance with one or more embodiments of the present invention. For example, systems and methods herein can include generating a first slice including an associated genesis block of a blockchain, as shown at 502. At 504, the system can apply an ASC to a first request by a device including a verification of the device and a grant of least-level privileges to the device. At 506, the system can add a block to the blockchain regarding use of the first slice by the device. At 508, the device can request to communicate with a secondary device. At 510, the system can apply an ASC to this request including a verification of the secondary device. At 512, a block is added to the blockchain regarding an allowed (for example deemed trustworthy) communication between the first device and the secondary device, and this block can include pointers to previous blocks. At 514, the device can request access to a second slice, for example a dedicated line between a customer's device and a customer's supply chain, and a second blockchain can be initiated by the system in response to this request.

Embodiments may be described in the general context of computer code or machine-useable instructions, including computer-executable instructions such as program modules, being executed by a computer or other machine. Generally, program modules including routines, programs, objects, components, data structures, etc. refer to code that perform particular tasks or implement particular abstract data types. Embodiments may be practiced in a variety of system configurations. Embodiments may also be practiced in distributed computing environments where tasks are performed by remote-processing devices that are linked through a communications network.

Figure 6:
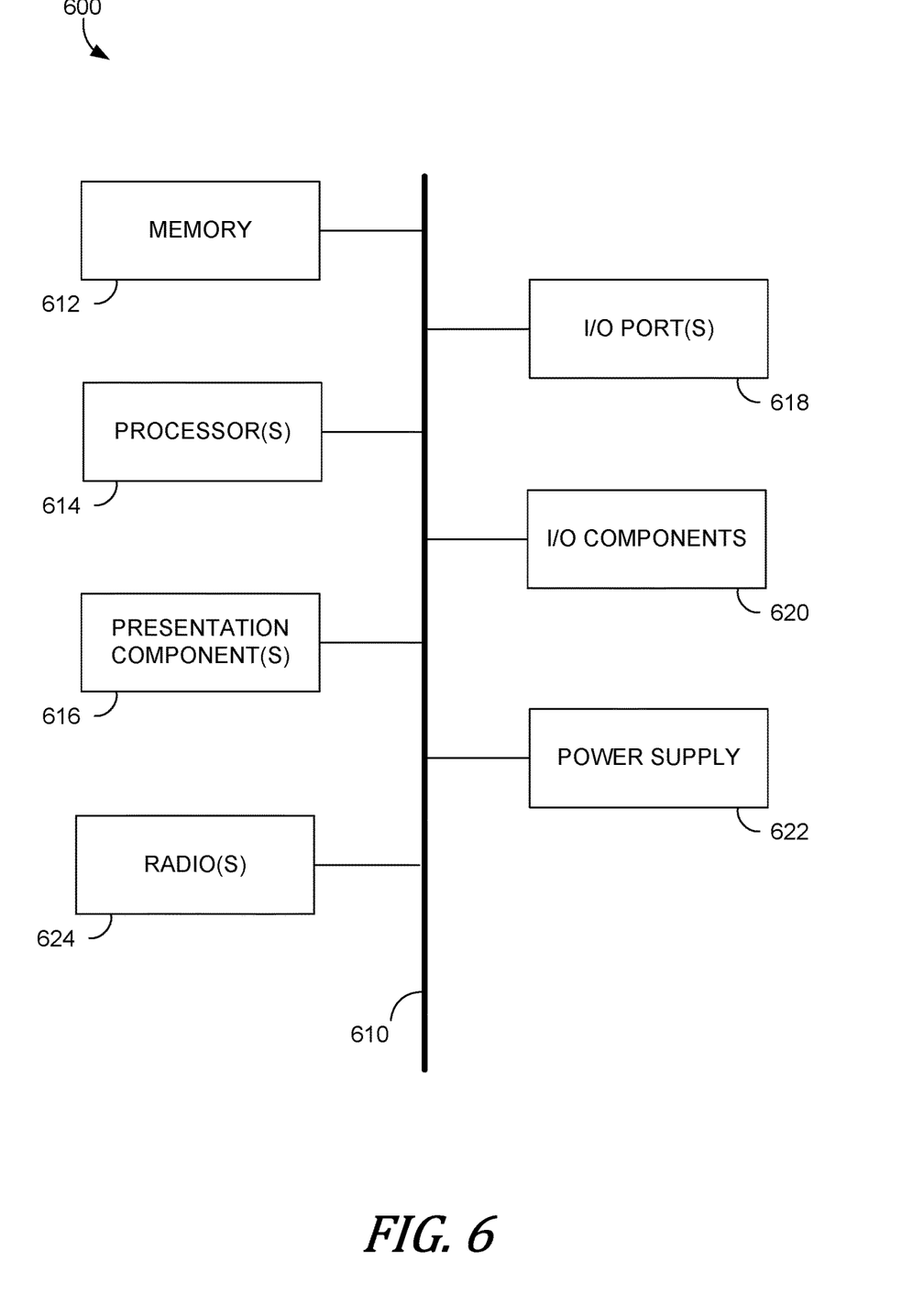
FIG. 6 depicts an exemplary diagram illustrating aspects of a system suitable for use in implementations of the present disclosure.

In FIG. 6, computing device 610 can directly or indirectly couple to the following devices: memory 612, one or more processors 614, one or more presentation components 616, input/output ports 618, input/output components 620, illustrative power supply 622, and one or more radio sources or aspects 624. The various blocks of FIG. 6 are shown with lines for the sake of conceptual clarity, and other arrangements of the described components and/or component functionality are contemplated. For example, processors have memory. The diagram of FIG. 6 is merely illustrative of an example computing device that can be used in connection with one or more embodiments of the present invention.

Computing device 610 typically includes a variety of computer-readable media. Computer-readable media can be any available media that can be accessed by computing device 610 and includes both volatile and nonvolatile media, removable and non-removable media. By way of example, and not limitation, computer-readable media may comprise computer storage media and communication media. Computer storage media excludes signals per se. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 610.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 610 includes one or more processors that read data from various entities such as memory 612 or I/O components 620. Presentation component(s) 616 present data indications to a user or other device. Exemplary presentation components include a display device, speaker, printing component, vibrating component, etc. I/O ports 618 allow computing device 610 to be logically coupled to other devices including I/O components 620, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An improved system for provisioning of a Virtual Network Function (VNF) instance, the system comprising:
   a network device, in communication with a distributed ledger database, configured to assign a first VNF instance to a first device;
   a distributed ledger database storing a first blockchain associated with the first VNF instance, the first blockchain including a first block indicating indication that the first device was authenticated, wherein the first indication comprises an identification of one or more trust certificates;
   an Adaptive Security Controller (ASC) comprising a processor, the processor configured to verify a second device based on a request by the first device to communicate with the second device, wherein the distributed ledger database stores a second block in the first blockchain regarding the allowed communication between the first device and the second device; and
   the distributed ledger database storing a second blockchain associated with a second VNF instance, wherein the second VNF instance is based on a request by the first device for a dedicated line.

2. The system of claim 1, wherein the ASC is configured to analyze the one or more trust certificates, and apply a least-level privilege grant component, in association with assigning the first VNF instance to the first device.

3. The system of claim 1, wherein the blockchain includes an end-of-life block comprising one or more pointers to a genesis block.

4. The system of claim 1, wherein the dedicated line is a line between the first device and a supply chain associated with the first device.

5. The system of claim 4, wherein the dedicated line allows a manufacturing entity to perform supply chain operations using the second VNF instance again in the future.

6. The system of claim 1, wherein the first blockchain is configured to be used to re-instantiate the first VNF instance based on a control reference.

7. The system of claim 6, wherein the control reference comprises a smart contract aspect.

8. A method for provisioning of a Virtual Network Function (VNF) instance comprising:
   assigning a first VNF instance to a first device by a network device, in communication with a distributed ledger database;
   storing, by a distributed ledger database, a first blockchain associated with the first VNF instance, the first blockchain including a first block indicating that the first device was authenticated, wherein the first indication comprises an identification of one or more trust certificates;
   verifying, by an Adaptive Security Controller (ASC) comprising a processor, a second device based on a request by the first device to communicate with the second device, wherein the distributed ledger database stores a second block in the first blockchain regarding the allowed communication between the first device and the second device; and
   storing, by the distributed ledger database, a second blockchain associated with a second VNF instance, wherein the second VNF instance is based on a request by the first device for a dedicated line.

9. The method of claim 8, wherein the ASC is configured to analyze the one or more trust certificates, and apply a least-level privilege grant component, in association with assigning the first VNF instance to the first device.

10. The method of claim 8, wherein the blockchain includes an end-of-life block comprising one or more pointers to a genesis block.

11. The method of claim 8, wherein the dedicated line is a line between the first device and a supply chain associated with the first device.

12. The method of claim 11, wherein the dedicated line allows a manufacturing entity to perform supply chain operations using the second VNF instance again in the future.

13. The method of claim 8, wherein the first blockchain is configured to be used to re-instantiate the first VNF instance based on a control reference.

14. The method of claim 13, wherein the control reference comprises a smart contract aspect.

15. One or more non-transitory computer-readable media having computer-executable instructions embodied thereon that, when executed, perform a method for provisioning of a Virtual Network Function (VNF) instance, the method comprising:
   assigning a first VNF instance to a first device by a network device, in communication with a distributed ledger database;

storing, by a distributed ledger database, a first blockchain associated with the first VNF instance, the first blockchain including a first block indicating that the first device was authenticated, wherein the first indication comprises an identification of one or more trust certificates;

verifying, by an Adaptive Security Controller (ASC) comprising a processor, a second device based on a request by the first device to communicate with the second device, wherein the distributed ledger database stores a second block in the first blockchain regarding the allowed communication between the first device and the second device; and storing, by the distributed ledger database, a second blockchain associated with a second VNF instance, wherein the second VNF instance is based on a request by the first device for a dedicated line.

16. The one or more non-transitory computer-readable media of claim 15, wherein the ASC is configured to analyze the one or more trust certificates, and apply a least-level privilege grant component, in association with assigning the first VNF instance to the first device.

17. The one or more non-transitory computer-readable media of claim 15, wherein the blockchain includes an end-of-life block comprising one or more pointers to a genesis block.

18. The one or more non-transitory computer-readable media of claim 15, wherein the dedicated line is a line between the first device and a supply chain associated with the first device.

19. The one or more non-transitory computer-readable media of claim 15, wherein the first blockchain is configured to be used to re-instantiate the first VNF instance based on a control reference.

20. The one or more non-transitory computer-readable media of claim 19, wherein the control reference comprises a smart contract aspect.

* * * * *

UNITED STATES PATENT AND TRADEMARK OFFICE
CERTIFICATE OF CORRECTION

PATENT NO. : 12,477,328 B1  
APPLICATION NO. : 17/360065  
DATED : November 18, 2025  
INVENTOR(S) : Lyle Walter Paczkowski Page 1 of 1

It is certified that error appears in the above-identified patent and that said Letters Patent is hereby corrected as shown below:

In the Claims

Under Column no. 17, Claim 1, Line no. 51, please replace "block indicating indication that" with --block indicating that--.

Signed and Sealed this  
Third Day of February, 2026

John A. Squires  
*Director of the United States Patent and Trademark Office*